US012107344B2

(12) United States Patent
Uejima

(10) Patent No.: US 12,107,344 B2
(45) Date of Patent: Oct. 1, 2024

(54) ANTENNA DEVICE

(71) Applicant: Panasonic Intellectual Property Management Co., Ltd, Osaka (JP)

(72) Inventor: Hiroyuki Uejima, Ishikawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 199 days.

(21) Appl. No.: 17/762,699

(22) PCT Filed: Sep. 18, 2020

(86) PCT No.: PCT/JP2020/035370

§ 371 (c)(1),
(2) Date: Mar. 22, 2022

(87) PCT Pub. No.: WO2021/060167

PCT Pub. Date: Apr. 1, 2021

(65) Prior Publication Data

US 2022/0344813 A1 Oct. 27, 2022

(30) Foreign Application Priority Data

Sep. 27, 2019 (JP) ................................ 2019-176796

(51) Int. Cl.
*H01Q 5/328* (2015.01)
*H01Q 9/04* (2006.01)
*H01Q 9/30* (2006.01)

(52) U.S. Cl.
CPC .......... *H01Q 5/328* (2015.01); *H01Q 9/0407* (2013.01); *H01Q 9/30* (2013.01)

(58) Field of Classification Search
CPC ......... H01Q 5/328; H01Q 9/0407; H01Q 9/30
See application file for complete search history.

(56) References Cited

U.S. PATENT DOCUMENTS 10,263,327 B1 4/2019 Zou et al.
2019/0165476 A1 5/2019 Hong et al.
2019/0319364 A1* 10/2019 Yang .................... H01Q 9/0457

FOREIGN PATENT DOCUMENTS

JP 2000-183643 A 6/2000
JP 2003-309424 A 10/2003

OTHER PUBLICATIONS

Extended European Search Report, dated Sep. 26, 2022, for European Patent Application No. 20869793.8-1205. (10 pages).

(Continued)

*Primary Examiner* — Dieu Hien T Duong
(74) *Attorney, Agent, or Firm* — Seed IP Law Group LLP

(57) ABSTRACT

The present invention provides an antenna device having a simple configuration for multiband operation. The antenna device is provided with: a first antenna element which is provided in a first layer of a multi-layer substrate and has a first frequency band; a second antenna element which is provided in a second layer of the multi-layer substrate different from the first layer, and has a second frequency band lower than the first frequency band; a ground substrate; a first feeding line path extending from the first antenna element toward the ground substrate; a second feeding line path extending from the second antenna element toward the ground substrate; and a filter connecting the second antenna element and the around substrate, the filter passing a signal of the first frequency band and blocking a signal of the second frequency band.

9 Claims, 6 Drawing Sheets

(56) References Cited

OTHER PUBLICATIONS

International Search Report, mailed Nov. 17, 2020, for International Application No. PCT/JP2020/035370 (5 pages including translation).

* cited by examiner

ANTENNA DEVICE

TECHNICAL FIELD

The present disclosure relates to an antenna apparatus.

BACKGROUND ART

In recent years, there have been discussions on a multi-band antenna apparatus that transmits and/or receives signals in a plurality of frequency bands (e.g., Patent Literature (hereinafter, referred to as "PTL" 1 and PTL 2).

CITATION LIST

Patent Literature

PTL 1
Japanese Patent Application Laid-Open No. 2003-309424
PTL 2
Japanese Patent Application Laid-Open No. 2000-183643

SUMMARY OF INVENTION

Technical Problem

However, an antenna apparatus operating in multiple bands with a simple configuration has not been sufficiently discussed.

One non-limiting and exemplary embodiment of the present disclosure facilitates providing an antenna apparatus operating in multiple bands with a simple configuration.

An antenna apparatus according to one example of the present disclosure includes: a first antenna element for a first frequency band, the first antenna element being provided on a first layer of a multilayer board; a second antenna element for a second frequency band, the second antenna element being provided on a second layer that is different from the first layer in the multilayer board; a ground board; a first feeder line extending from the first antenna element toward the ground board; a second feeder line extending from the second antenna element toward the ground board; and a filter connecting between the second antenna element and the ground board, allowing a signal of the first frequency band to pass through the filter, and blocking a signal of the second frequency band.

It should be noted that general or specific embodiments may be implemented as a system, an apparatus, an integrated circuit, a computer program or a storage medium, or may be implemented as any combination of a system, an apparatus, a method, an integrated circuit, a computer program, and a storage medium.

According to one example of the present disclosure, it is possible to realize an antenna apparatus operating in multiple hands with a simple configuration.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the drawings.

Embodiment 1

A multiband antenna apparatus that transmits and/or receives signals in a plurality of frequency bands has been discussed.

PTL 1 describes a multi-frequency shared antenna including a patch antenna element for 2.4 GHz and a patch antenna element for 5.2 GHz. The patch antenna element for 2.4 GHz is used as a ground plate of the patch antenna element for 5.2 GHz. In the multi-frequency shared antenna described in PTL 1, a feeder line for supplying power to the patch antenna element for 5.2 GHz has a structure of a coaxial cable and passes through the center where the electric field of the patch antenna element for 2.4 GHz is zero.

PTL 2 describes an antenna apparatus including a Global Positioning System (GSP) antenna element and a monopole antenna that transmits and receives a communication band signal in a cellular telephone band. The circular plate of the monopole antenna functions as a ground plate of the GPS antenna element. In the antenna apparatus described in PTL 2, a feeder line having a structure of a coaxial cable supplies power to each antenna.

However, in PTLs 1 and 2 described above, a feeder line having a structure of a coaxial cable is used to supply power to the antenna, which makes it difficult for the antenna apparatus to have a simple configuration.

One non-limiting and exemplary embodiment of the present disclosure facilitates providing an antenna apparatus operating in multiple bands with a simple configuration.

Figure 1A:
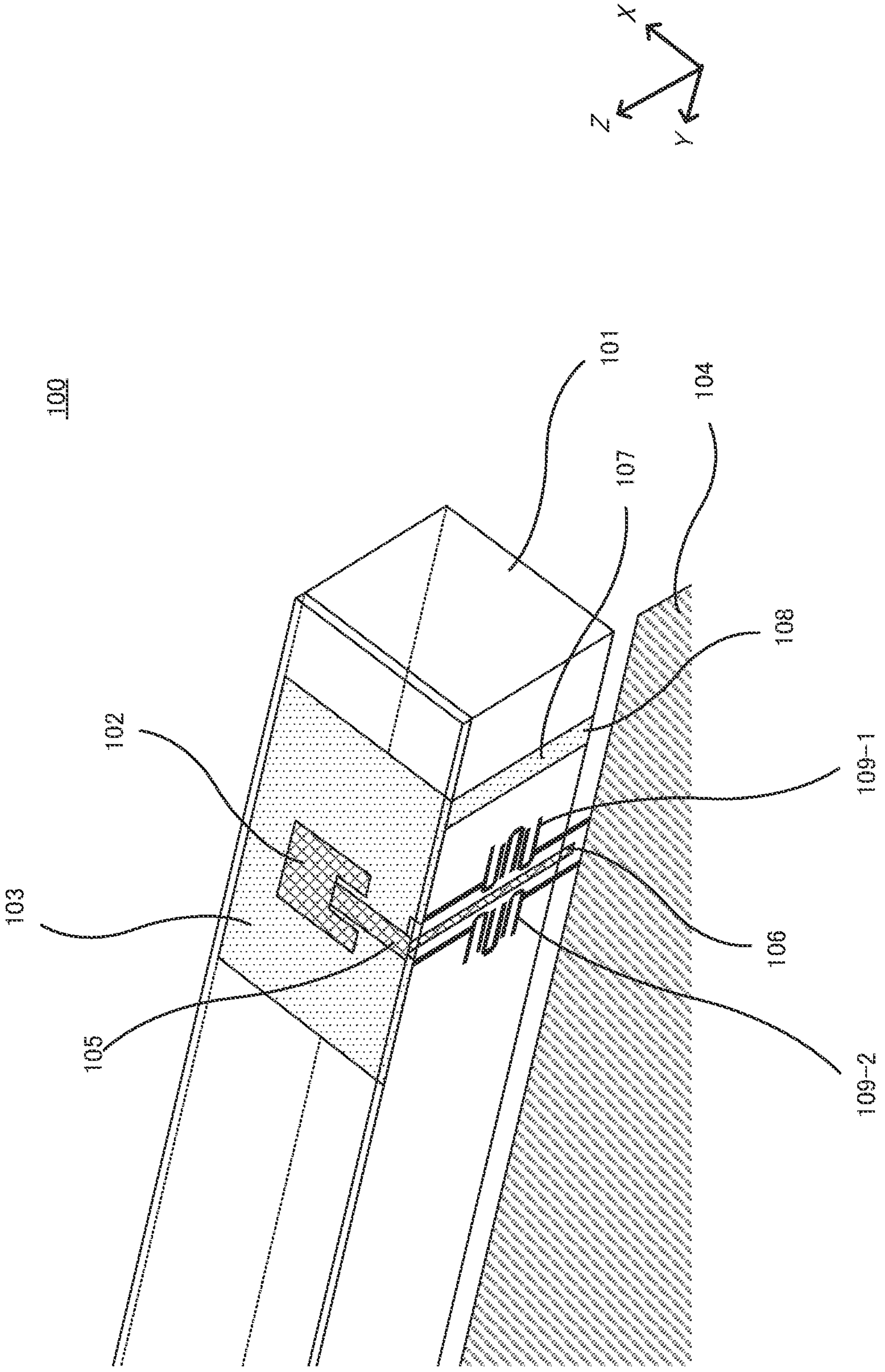
FIG. 1A is a perspective view of an example of a configuration of an antenna apparatus according to Embodiment 1.
Figure 1B:
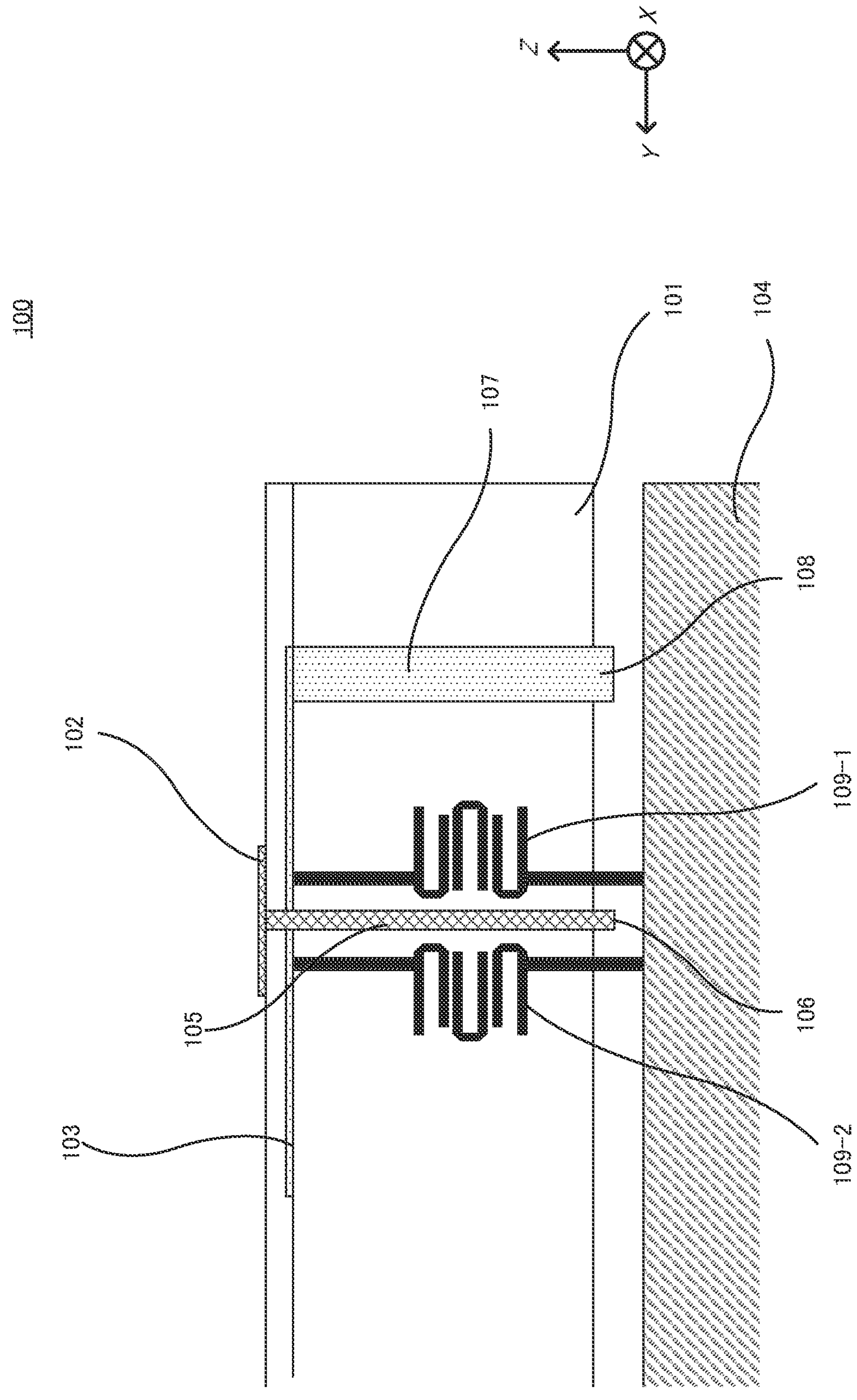
FIG. 1B is a side view of the example of the configuration of the antenna apparatus according to Embodiment 1.
Figure 1C:
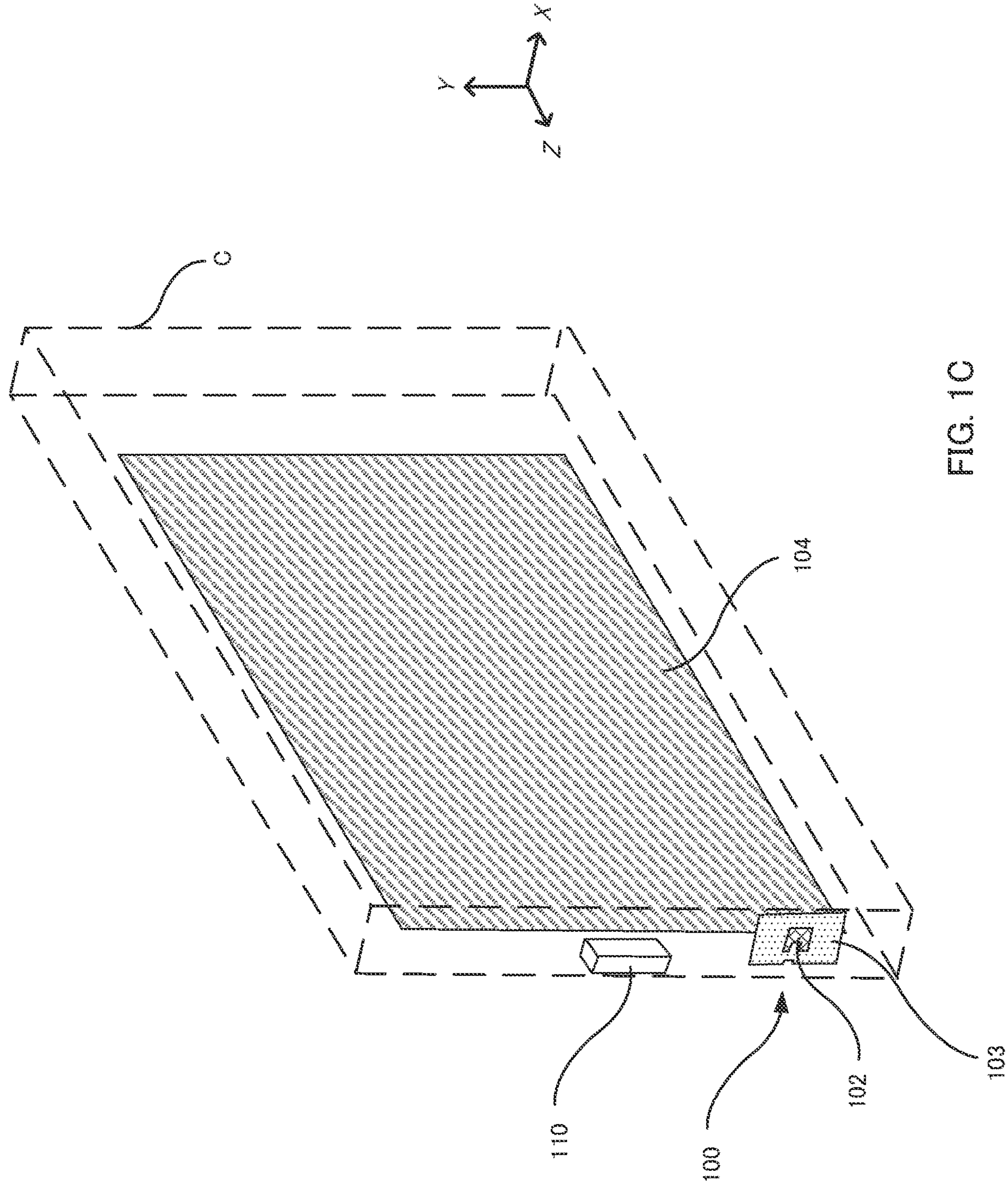
FIG. 1C is a diagram illustrating an example of a smartphone equipped with the antenna apparatus according to Embodiment 1.

FIG. 1A is a perspective view of an example of a configuration of an antenna apparatus according to Embodiment 1. FIG. 1B is a side view of the example of the configuration of the antenna apparatus according to Embodiment 1. FIG. 1C is a diagram illustrating an example of a smartphone equipped with the antenna apparatus according to Embodiment 1. Note that an X-axis, a Y-axis, and a Z-axis are shown in each of FIGS. 1A, 1B and 1C. Further, a broken line in FIG. 1C. shows housing C of a smartphone.

Antenna apparatus 100 includes patch antenna element 102, monopole antenna element 103, radio circuit board GND (Ground) 104, a feeder line 105 for a high frequency band (hereinafter, "high-frequency band feeder line 105"), a feeder line 107 for a low frequency band (hereinafter, "low-frequency band feeder line 107"), and hairpin filters 109 (109-1 and 109-2).

Multilayer dielectric board (which may be referred to as "dielectric board" or "multilayer board") 101 is formed of a plurality of dielectric layers along the X-Y plane.

Patch antenna element 102 is provided, for example, on a surface layer of multilayer dielectric board 101 along the X-Y plane. Patch antenna element 102 transmits and/or receives a signal of a high frequency band (e.g., 28 GHz band) (hereinafter, may be referred to as a "high-frequency band signal"). In the following, transmitting and/or receiving a signal in a certain frequency band by an antenna (element) may be described as operating in a certain frequency band by an antenna (element). Patch antenna element 102 has a rectangular shape, and one side of the rectangle has about half length of the wavelength corresponding to the operating frequency (e.g., 28 GHz).

Monopole antenna element 103 is provided along the X-Y plane on a layer (inner layer) that is different from the surface layer of multilayer dielectric board 101. Monopole antenna element 103 operates in a low frequency band (e.g., 2.4 GHz band). Monopole antenna element 103 has a quarter length (length in the Y-axis direction) of the wavelength corresponding to the operating frequency (e.g., 2.4 GHz) and a width (length in the X-axis direction) longer than the halt wavelength corresponding to the operating frequency of patch antenna element 102 (e.g., 28 GHz).

Patch antenna element 102 is provided at the position overlapping with monopole antenna element 103 in a plan view from the positive direction of the Z-axis. Note that patch antenna element 102 may be provided in the position overlapping with at least a portion of monopole antenna element 103 in a plan view from the positive direction of the Z-axis. Radio circuit board GND (which may be referred to as "ground board") 104 is a GND of the board on which a radio circuit for supplying power in a high frequency hand and a low frequency band is provided.

High-frequency band feeder line 105 extends from patch antenna element 102 toward radio circuit board GND 104. One end of high-frequency band feeder line 105 is connected to patch antenna element 102. A feeder 106 for a high frequency band (hereinafter, "high-frequency band feeder 106") is provided at the other end of high-frequency band feeder line 105. High-frequency band feeder line 105 includes a first feeder line provided on the same surface on which patch antenna element 102 is provided and a second feeder line provided on the same surface on which hairpin filter 109 is provided.

High-frequency band feeder 106 receives power in a high frequency band from the radio circuit.

Low-frequency band feeder line 107 extends from monopole antenna element 103 toward radio circuit board GND 104. One end of low-frequency band feeder line 107 is connected to monopole antenna element 103. A feeder 108 for a low frequency band (hereinafter, "low-frequency band feeder 108") is provided at the other end of low-frequency band feeder line 107.

Low-frequency band feeder 108 receives power in a low frequency band from the radio circuit.

Hairpin filters 109-1 and 109-2 have low impedance characteristics in the high frequency band and allow a signal in a high frequency band to pass therethrough. Hairpin liners 109-1 and 109-2 have high impedance characteristics in a low frequency band and block the signal in the low frequency band. One end of hairpin filter 109-1 is connected to monopole antenna element 103, and the other end is connected to radio circuit board GND 104. One end of hairpin filter 109-2 is connected to monopole antenna element 103, and the other end is connected to radio circuit board GND 104.

The second feeder line of high-frequency band feeder line 105, low-frequency band feeder line 107, and hairpin filters 109-1 and 109-2 may be placed on the same surface of multilayer dielectric board 101. For example, the second feeder line of high-frequency band feeder line 105, low-frequency band feeder line 107, and hairpin filters 109-1 and 109-2 are provided on the surface of multilayer dielectric board 101 in the Y-Z plane. In other words, the surface (e.g., the Y-Z plane) on which the second feeder line of high-frequency band feeder line 105, low-frequency band feeder line 107, and hairpin filters 109-1 and 109-2 are provided may be orthogonal to the surface (e.g., the X-Y plane) on which patch antenna element 102 is provided and the surface on which monopole antenna element 103 is provided.

For example, hairpin filter 109-1 and hairpin filter 109-2 are provided at a position where the second feeder line of high-frequency band feeder line 105 is interposed therebetween. Hairpin filter 109-1 and hairpin filter 109-2 are provided along at least a portion (in parallel with at least a portion) of the second feeder line of high-frequency band feeder line 105.

Hairpin filter 109-1 and hairpin filter 109-2 may be provided in the vicinity of the second feeder line of high-frequency band feeder line 105. For example, the space between hairpin filter 109-1 (or hairpin filter 109-2) and the second feeder line of high-frequency band feeder line 105 may be less than half the space between the second feeder line of high-frequency band feeder line 105 and low-frequency band feeder line 107.

Voice receiver (receiver) 110 of the smartphone equipped with antenna apparatus 100 outputs the voice of the other party in a voice call. Voice receiver 110 is disposed at an upper end (positive direction of the Z-axis in FIG. 1C) in a front view of the smartphone. Antenna apparatus 100 is disposed in the vicinity of voice receiver 110.

Next, an operation example of antenna apparatus 100 will be described. The operation example described below is an operation example when antenna apparatus 100 transmits a signal. Note that the operation example when antenna apparatus 100 receives a signal may be the same as the operation example when antenna apparatus 100 transmits a signal as described below except that an antenna element receives a signal.

When the radio circuit board that is connected to low-frequency band feeder 108 and performs processing of a 2.4 GHz band signal supplies power to low-frequency band feeder 108, monopole antenna element 103 radiates a 2.4 GHz band signal. In this case, hairpin filters 109-1 and 109-2 have high impedance characteristics in the 2.4 GHz band and block a 2.4 GHz band signal, so that the radiation of the signal from monopole antenna element 103 is not affected (or the influence can be minimized), Also, in this case, patch antenna element 102 is sufficiently small in size for a 2.4 GHz band signal, so that the radiation of the signal from monopole antenna element 103 is not affected (or the influence can be minimized).

When the radio circuit board that is connected to high-frequency band feeder 106 and performs processing of a 28 GHz band signal supplies power to high-frequency band feeder 106, patch antenna element 102 radiates a 28 GHz band signal. In this case, hairpin filters 109-1 and 109-2 have low impedance characteristics in the 28 GHz band and thus allows the 28 GHz band signal to pass therethrough, so that radio circuit board GND 104 and monopole antenna element 103 are connected with each other. When radio circuit board GND 104 and monopole antenna element 103 are connected with each other, monopole antenna element 103 functions as a ground plate of patch antenna element 102 and the main radiation direction of patch antenna element 102 is a positive direction of the Z-axis.

As described above, in antenna apparatus 100 according to Embodiment 1, hairpin filters 109-1 and 109-2 are provided at the position where high-frequency band feeder line 105 is interposed therebetween. This structure can simplify the configuration because power can be supplied to patch antenna element 102 by the planar structure without using a coaxial cable.

For example, power can be supplied to patch antenna 102 by high-frequency band feeder line 105 and hairpin filter 109 that are provided in the Y-Z plane, which is different from the X-Y plane where patch antenna element 102 is provided.

Further, this structure can simplify the configuration because the limitation on the arrangement position of an element for a high frequency band (e.g., patch antenna element 102) with respect to an element for a low frequency band (e.g., monopole antenna element 103) is relaxed.

Moreover, this structure can form a multiband antenna apparatus by a layered dielectric chip antenna.

Further, in Embodiment 1, radio circuit board GND 104 is disposed along the Y-Z plane of housing C of the smartphone as shown in FIG. 1C. Fax example, disposing radio circuit board GND 104 in the Y-Z plane makes the surface where patch antenna element 102 and monopole antenna element 103 are provided perpendicular to radio circuit board GND 104. This arrangement can reduce the influence of interruption or the like caused by the user's hand or head on the signal radiated (received) by patch antenna element 102, because, as shown in FIG. 1C, the Z direction, which is the radiation direction of patch antenna element 102, is the direction that avoids the hand and head positions of the user who holds the smartphone to make a call. Further, the influence of the signal radiated by patch antenna element 102 on the human body ca be reduced.

Embodiment 2

Figure 2:
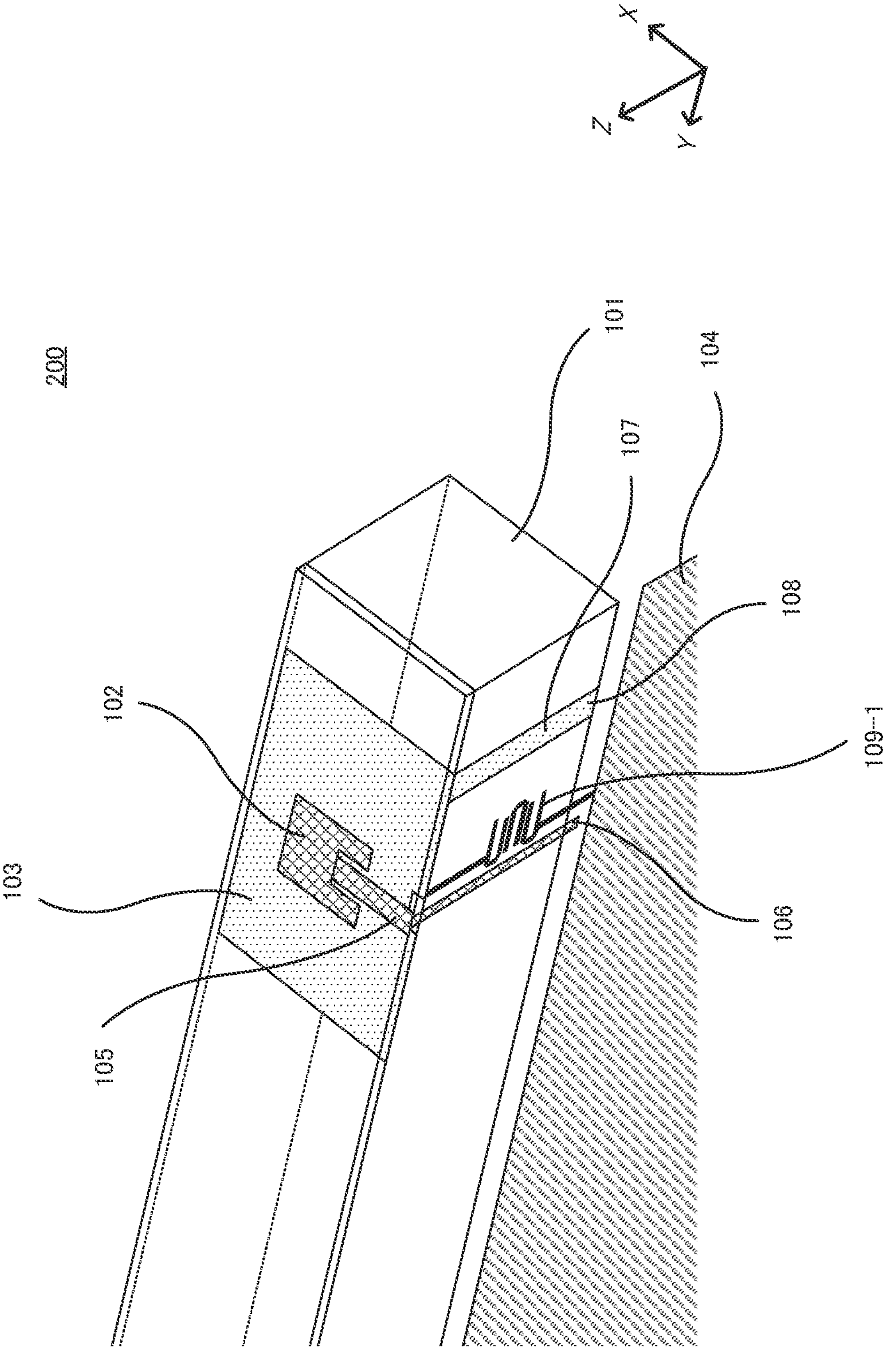
FIG. 2 is a perspective view of an example of a configuration of an antenna apparatus according to Embodiment 2.

FIG. 2 is a perspective view of an example of a configuration of an antenna apparatus according to Embodiment 2. Note that the same components as those of antenna apparatus 100 shown in FIGS. 1A to 1C are denoted by the same reference numerals, and description thereof may be omitted in antenna apparatus 200 shown in FIG. 2.

Antenna apparatus 200 has a configuration in which one of two hairpin filters 109-1 and 109-2 in antenna apparatus 100 is omitted (e.g., hairpin filter 109-2). In other words, hairpin filter 109 shown in Embodiment 1 may not be disposed along both sides of high-frequency band feeder line 105 in Embodiment 2, and may be disposed along one side of high-frequency band feeder line 105.

The operation of antenna apparatus 200 is the same as the operation of antenna apparatus 100 described in Embodiment 1. However, since antenna apparatus 200 has a configuration in which hairpin filter 109-2 is omitted from antenna apparatus 100, the degree of influence of high-frequency band feeder line 105 on radiation is high in antenna apparatus 200, compared to antenna apparatus 100.

As described above, in antenna apparatus 200 according to Embodiment 2, hairpin filter 109 (e.g., hairpin filter 109-1) is provided along high-frequency band feeder line 105, similarly to Embodiment 1. This structure can simplify the configuration because power can be supplied to patch antenna element 102 by the planar structure without using a coaxial cable. Further, this structure can simplify the configuration because the limitation on the arrangement position of an element for a high frequency band with respect to an element for a low frequency band is relaxed. Moreover, this structure can form a multiband antenna apparatus by a layered dielectric chip antenna.

Further, in Embodiment 2, similarly to Embodiment 1, the influence of interruption or the like caused by the user's hand or head on the signal radiated (received) by patch antenna element 102 can be reduced, because the Z direction, which is the radiation direction of patch antenna element 102, is the direction that avoids the hand and head positions of the user who holds the smartphone to make a call. The influence of the signal radiated by patch antenna element 102 on the human body can be also reduced.

Embodiment 3

Figure 3:
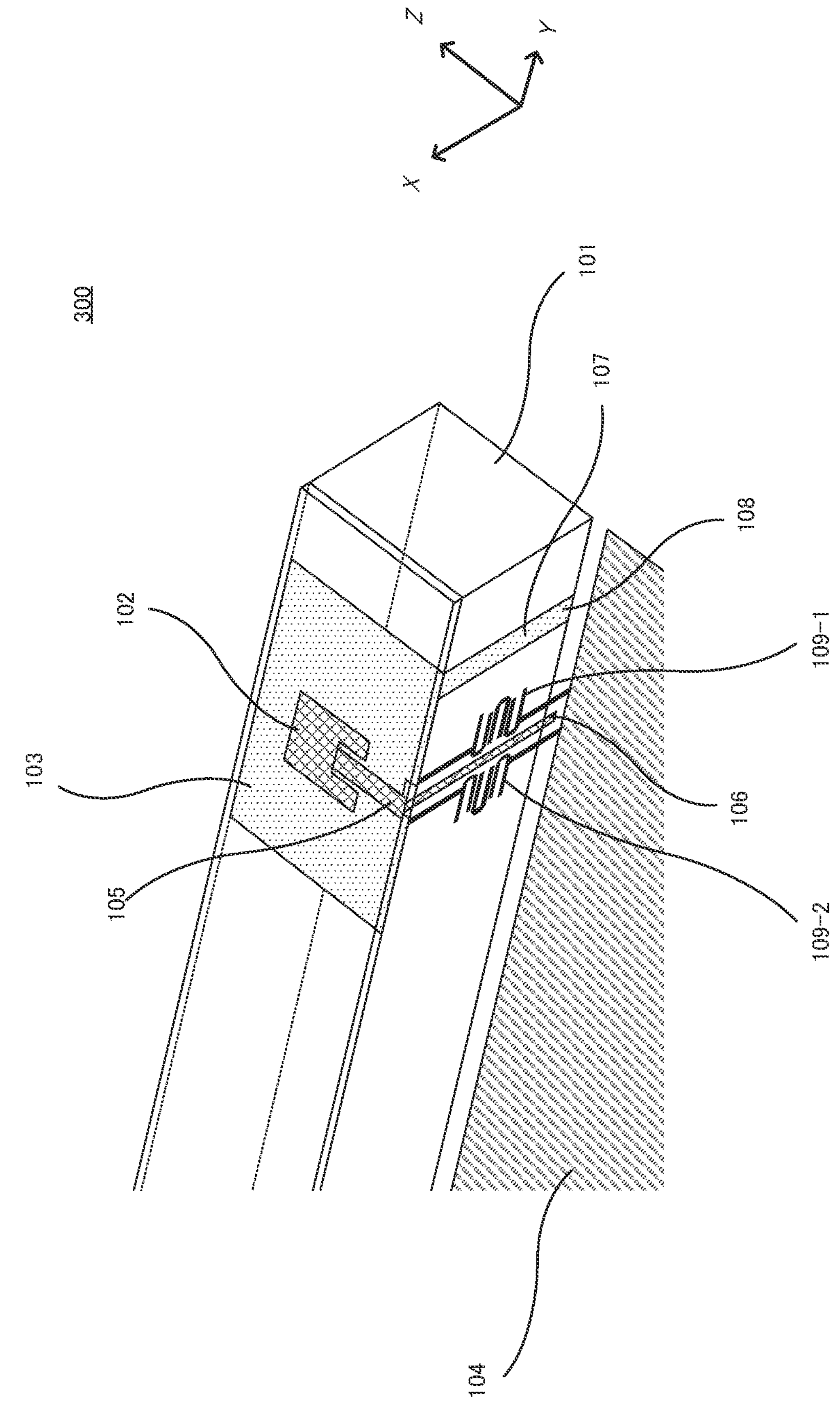
FIG. 3 is a perspective view of an example of a configuration of an antenna apparatus according to Embodiment 3.

FIG. 3 is a perspective view of an example of a configuration of an antenna apparatus according to Embodiment 3. Note that the same components as those of antenna apparatus 100 shown in FIGS. 1A to 1C are denoted by the same reference numerals, and description thereof may be omitted in antenna apparatus 300 shown in FIG. 3.

In antenna apparatus 100 shown in FIGS. 1A to 1C, patch antenna element 102 and monopole element 103 are provided along the X-Y plane, whereas in antenna apparatus 300 shown in FIG. 3, patch antenna element 102 and monopole element 103 are provided along the Y-Z plane.

In other words, in antenna apparatus 100, the surface where patch antenna element 102 and monopole element 103 are provided (e.g., the X-Y plane) is perpendicular to radio circuit board GND 104, whereas in antenna apparatus 300, the surface where patch antenna element 102 and monopole element 103 are provided (e.g., the Y-Z plane) is parallel to radio circuit board GND 104.

The operation of antenna apparatus 300 is the same as the operation of antenna apparatus 100 described in Embodiment 1. However, while the main radiation direction of patch antenna element 102 in antenna apparatus 100 is the positive direction of the Z-axis, the main radiation direction of patch antenna element 102 in antenna apparatus 300 is the positive direction of the X-axis.

As described above, in antenna apparatus 300 according to Embodiment 3, hairpin filter 109 is provided along high-frequency band feeder line 105, similarly to Embodiments 1 and 2. This structure can simplify the configuration because power can be supplied to patch antenna element 102 by the planar structure without using a coaxial cable. Further, this structure can simplify the configuration because the limitation on the arrangement position of an element for a high frequency band against an element for a low frequency band is relaxed. Moreover, this structure can form a multiband antenna apparatus by a layered dielectric chip antenna.

Further, in Embodiment 3, the influence of interruption or the like caused by the user's hand or head on the signal radiated (received) by patch antenna element 102 can be reduced because the positive direction of the X-axis, Which is the radiation direction of patch antenna element 102, is the direction that avoids the hand position of the user who holds the smartphone to make a call.

Embodiment 4

Figure 4:
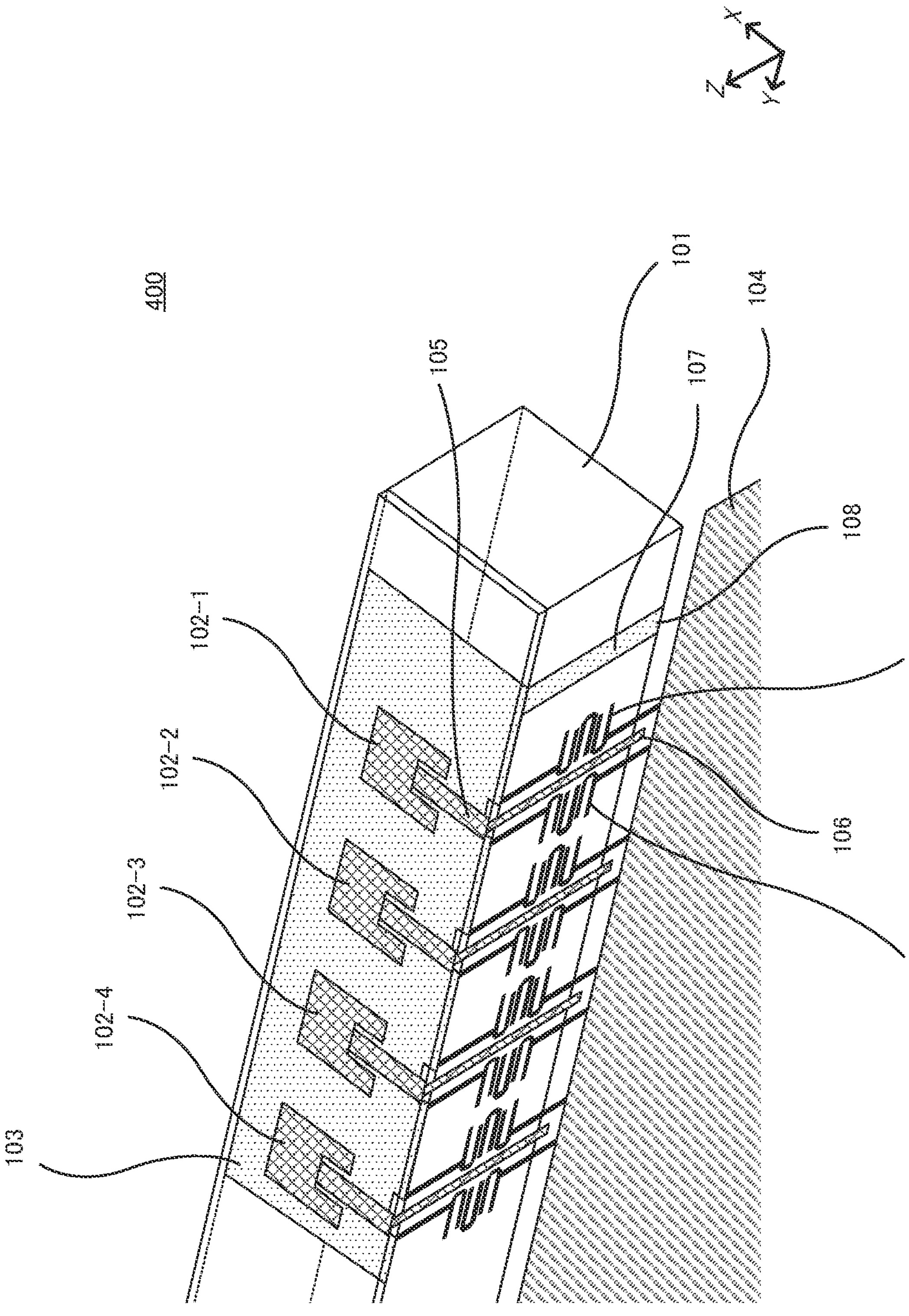
FIG. 4 is a perspective view of an example of a configuration of an antenna apparatus according to Embodiment 4.

FIG. 4 is a perspective view of an example of a configuration of antenna apparatus 400 according to Embodiment 4. Note that the same components as those of antenna apparatus 100 shown in FIG. 1A to FIG. 1C are denoted by the same reference numerals, and description thereof may be omitted in antenna apparatus 400 shown in FIG. 4.

Antenna apparatus 100 shown in Embodiment 1 includes one patch antenna element 102, high-frequency band feeder line 105 connected to patch antenna 102, and hairpin filter 109-1 and hairpin filter 109-2 provided along at least a portion of high-frequency band feeder line 105. Antenna apparatus 400 according to Embodiment 4 includes four patch antenna elements 102 (102-1 to 102-4) and sets of high-frequency band feeder line 105 and hairpin filter 109, respectively, for four patch antenna elements 102. Then, four patch antenna elements 102 are arranged at pitches of substantially half wavelength of the free space wavelength corresponding to a 28 GHz band. Four patch antenna elements 102 take an array arrangement corresponding to the 28 GHz band.

Further, the operating frequency band of monopole antenna element 103 is set to, for example, a 2.4 GHz band in antenna apparatus 100. The frequency band of monopole antenna element 103 in antenna apparatus 400 is set to, for example, a frequency band (Global Positioning System (GPS) band (for example, 1.575 GHz band)) used by GPS. Thus, the size of monopole antenna element 103 of antenna apparatus 400 is larger than the size of monopole antenna element 103 in antenna apparatus 100.

Hairpin filter 109 of antenna apparatus 400 has low impedance characteristics in a 28 GHz band and the signal of the 28 GHz band passes through hairpin filter 109. Hairpin filter 109 of antenna apparatus 400 has high impedance characteristics in a GPS band and blocks the signal of the GPS band.

Next, an operation example of antenna apparatus 400 will be described. Note that the operation example described below is the operation example when antenna apparatus 400 transmits a signal.

When a radio circuit that is connected to low-frequency band feeder 108 and performs processing of a 1.575 GHz band signal supplies power to low-frequency band feeder 108, monopole antenna element 103 radiates a 1.575 GHz band signal. In this case, hairpin filter 109 has high impedance characteristics in the 1.575 GHz band and blocks the 1.575 GHz band signal, so that the radiation of the signal from monopole antenna element 103 is not affected for the influence can be minimized). Also, in this case, patch antenna element 102 is sufficiently small in size for a 1.575 GHz band signal, so that the radiation of the signal from monopole antenna element 103 is not affected (or the influence can be minimized).

When a radio circuit that is connected to high-frequency band feeder 106 and performs processing of a 28 GHz band signal supplies power to high-frequency band feeder 106, patch antenna element 102 radiates a 28 GHz band signal. In this case, hairpin filters 109-1 and 109-2 have low-impedance characteristics in the 28 GHz band and allow the 28 GHz band signal to pass therethrough, so that radio circuit board GND 104 and monopole antenna element 103 are connected with each other. When radio circuit board GND 104 and monopole antenna element 103 are connected with each other, monopole antenna element 103 functions as a ground plate of four patch antenna elements 102. Then, adjusting the amplitude and/or phase of the signal for supplying power to four patch antenna elements 102 controls the main radiation direction of the signal radiated from four patch, antenna elements 102 in the Y-Z plane.

As described above, in antenna apparatus 400 according to Embodiment 4, similarly to Embodiment 1, hairpin filter 109 is provided along high-frequency band feeder line 105. This structure can simplify the configuration because power can be supplied to patch antenna elements 102 by the planar structure without using a coaxial cable. Further, this structure can simplify the configuration because the limitation on the arrangement position of an element for a high frequency band with respect to an element for a low frequency band is relaxed. Moreover, this structure can form a multiband antenna apparatus by a layered dielectric chip antenna.

Further, in Embodiment 4, similarly to Embodiment 1, the influence of interruption or the like caused by the user's hand or head on the signal radiated (received) by patch antenna elements 102 can be reduced. The influence of the signal radiated by patch antenna elements 102 on the human body can be also reduced.

Further, in antenna apparatus 400 according to Embodiment 4, by arranging a plurality of patch antenna elements 102 in an array, it is possible to control the directivity in a high frequency band (e.g., 28 GHz band).

As described above, Embodiments 1 to 4 have been described as examples of the techniques in the present disclosure. However, the technique in the present disclosure is not limited thereto, and can be applied to embodiments in which changes, substitutions, additions, omissions, and the like have been made. It is also possible to combine the constituent elements described in Embodiments 1 to 4 as described above into a new embodiment.

Therefore, another embodiment will be exemplified below.

In Embodiments 1 to 4, patch antenna element 102 formed on multilayer dielectric board 101 has been described as an example of an element for a high frequency hand, and monopole antenna element 103 formed on multilayer dielectric board 101 has been described as an example of an element for a low frequency band. However, an antenna element may be an element that transmits and receives electromagnetic waves in a desired frequency. Therefore, an antenna element is not limited to the antenna configured with a multilayer dielectric board, and the type of the antenna is not limited to a certain type. However, a patch antenna and a monopole antenna configured with a multilayer dielectric board make it easier and less expensive to realize the present disclosure.

In Embodiments 1 to 4, hairpin filter 109 formed on multilayer dielectric board 101 has been described as an example of a filter. However, a filter may have characteristics that allow a high frequency band to pass therethrough and block a low frequency hand. Thus, a filter is not limited to a hairpin filter, and another high-pass filter or band-pass filter may be applied.

Embodiments 1 to 4 have illustrated an example in which the surface on which patch antenna elements 102 is provided and the surface on which monopole antenna element 103 is provided are orthogonal to the surface on which the second feeder line of high-frequency hand feeder line 105, low-frequency band feeder line 107 and hairpin filters 109-1 and 109-2 are provided. However, the present disclosure is not limited thereto. The surface on which patch antenna element 102 is provided and the surface on which monopole antenna element 103 is provided may form an angle other than a right angle, with the surface on which the second feeder line of high-frequency band feeder line 105, low-frequency band feeder line 107 and hairpin filters 109-1 and 109-2 are provided.

For example, the values of a high frequency band and a low frequency band described in Embodiments 1 to 4 are examples, and the present disclosure is not limited thereto.

Further, for example, Embodiments 1 to 3 have described the case where the number of patch antenna elements 102 is one, and Embodiment 4 has described the case where the number of patch antenna elements 102 is four, but the number of patch antenna elements 102 is not limited to one or four. For example, Embodiment 4 illustrates an example in which four patch antenna elements 102 are arranged in an array, but two, three, five, or more patch antenna elements 102 may be arranged in the array.

Moreover, for example, Embodiments 1 to 4 have described the case where an antenna apparatus operates in two frequency bands, but the present disclosure may be applied to an antenna apparatus that operates in three or more frequency bands. For example, monopole antenna element 103 of antenna apparatus 400 shown in FIG. 4 may be replaced with two monopole antenna elements operating in different low frequency hands from each other (e.g., 2.4 GHz band and 1.575 GHz hand). An antenna apparatus including a patch antenna element operating in a high frequency band and monopole antenna elements operating in two different low frequency bands, that is, an antenna apparatus operating in three different frequency bands may be configured by this replacement. In this configuration, a hairpin filter that connects between each of the monopole antenna element and the radio circuit board GND may block the frequency band in which the connected monopole antenna element operates.

It should be noted that, since the above-mentioned embodiments are for exemplifying the art in the present disclosure, various modifications, substitutions, additions, omissions, and the like can be performed within the scope of claims or the equivalent scope thereof.

The present disclosure can be realized by software, hardware, or software in cooperation with hardware. Each functional block used in the description of the each embodiment described above can be partly or entirely realized by an LSI such as an integrated circuit, and each process described in the embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred, to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a to telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

An antenna apparatus according to one example of the present disclosure includes: a first antenna element for a first frequency band, the first antenna element being provided on a first layer of a multilayer board; a second antenna element for a second frequency band, the second antenna element being provided on a second layer that is different from the first layer in the multilayer board; a ground board; a first feeder line extending from the first antenna element toward the ground board; a second feeder line extending from the second antenna element toward the ground board; and a filter connecting between the second antenna element and the ground board, allowing a signal of the first frequency band to pass through the filter, and blocking a signal of the second frequency band.

In one example of the present disclosure, a space between the filter and the first feeder line is less than half a space between the first feeder line and the second feeder line.

In one example of the present disclosure, two of the filters are provided at a position where the first feeder line is interposed between the two filters.

In one example of the present disclosure, the first feeder line, the second feeder line, and the filter are provided on a surface of the multilayer board orthogonal to the first layer.

In one example of the present disclosure, the ground board is provided along a plane parallel to the surface.

In one example of the present disclosure, the ground board is provided along a plane orthogonal to the surface.

In one example of the present disclosure, the first antenna element overlaps at least a portion of the second antenna element in plan view from a vertical direction of the first antenna element.

In one example of the present disclosure, a plurality of the first antenna elements are provided on the first layer, and a plurality of the first feeder lines extend respectively from the plurality of first antenna elements toward the ground board.

In one example of the present disclosure, a plurality of the filters are provided at positions where each of the plurality of first feeder lines is interposed between at least two of the plurality of filters.

The disclosure of Japanese Patent Application No. 2019-176796 dated Sep. 27, 2019 including the specification, drawings and abstract is incorporated herein by reference in its entirety.

INDUSTRIAL APPLICABILITY

One embodiment of the present disclosure is useful for antenna apparatuses operating in multiple bands.

REFERENCE SIGNS LIST

100, 200, 300, 400 Antenna apparatus
101 Multilayer dielectric board
102 Patch antenna element
103 Monopole antenna element
104 Radio circuit board GND
105 High-frequency hand feeder line
106 High-frequency hand feeder line
107 Low-frequency hand feeder line
108 Low-frequency hand feeder line
109 Hairpin filter
110 Voice receiver

The invention claimed is:

1. An antenna apparatus, comprising:
a first antenna element for a first frequency band, the first antenna element being provided on a first layer of a multilayer board;
a second antenna element for a second frequency band, the second antenna element being provided on a second layer that is different from the first layer in the multilayer board;
a ground board;
a first feeder line extending from the first antenna element toward the ground board;
a second feeder line extending from the second antenna element toward the ground board; and
a filter connecting between the second antenna element and the ground board, allowing a signal of the first frequency band to pass through the filter, and blocking a signal of the second frequency band.

2. The antenna apparatus according to claim 1, wherein a space between the filter and the first feeder line is less than half a space between the first feeder line and the second feeder line.

3. The antenna apparatus according to claim 1, wherein the filter comprises two filters provided at a position where the first feeder line is interposed between the two filters.

4. The antenna apparatus according to claim 1, wherein the first feeder line, the second feeder line, and the filter are provided on a surface of the multilayer board orthogonal to the first layer.

5. The antenna apparatus according to claim 4, wherein the ground board is provided along a plane parallel to the surface.

6. The antenna apparatus according to claim 4, wherein the ground board is provided along a plane orthogonal to the surface.

7. The antenna apparatus according to claim 1, wherein the first antenna element overlaps at least a portion of the second antenna element in plan view from a vertical direction of the first antenna element.

8. The antenna apparatus according to claim 1, wherein the first antenna element comprises a plurality of first antenna elements provided on the first layer, and
the first feeder line comprises a plurality of first feeder lines that extend respectively from the plurality of first antenna elements toward the ground board.

9. The antenna apparatus according to claim 8, wherein the filter comprises a plurality of filters provided at positions where each of the plurality of first feeder lines is interposed between at least two of the plurality of filters.

* * * * *